(12) United States Patent
Roterring et al.

(10) Patent No.: US 11,301,341 B2
(45) Date of Patent: Apr. 12, 2022

(54) REPLICATION SYSTEM TAKEOVER WITH HANDSHAKE

(71) Applicant: SAP SE, Walldorf (DE)

(72) Inventors: Christoph Roterring, Walldorf (DE); Reiner Singer, Schriesheim (DE); Werner Thesing, Walldorf (DE)

(73) Assignee: SAP SE, Walldorf (DE)

( * ) Notice: Subject to any disclaimer, the term of this patent is extended or adjusted under 35 U.S.C. 154(b) by 11 days.

(21) Appl. No.: 16/834,317

(22) Filed: Mar. 30, 2020

(65) Prior Publication Data

US 2021/0303421 A1 Sep. 30, 2021

(51) Int. Cl.
*G06F 11/20* (2006.01)
*G06F 3/06* (2006.01)

(52) U.S. Cl.
CPC .......... *G06F 11/2023* (2013.01); *G06F 3/065* (2013.01); *G06F 3/067* (2013.01); *G06F 3/0619* (2013.01); *G06F 2201/805* (2013.01)

(58) Field of Classification Search
CPC ............. G06F 11/1471; G06F 11/1474; G06F 11/2023; G06F 3/0619; G06F 3/065; G06F 3/067
See application file for complete search history.

(56) References Cited

U.S. PATENT DOCUMENTS

| | | | | |
|---|---|---|---|---|
| 2007/0198700 | A1* | 8/2007 | Vivian | G06F 11/2023 709/224 |
| 2015/0317221 | A1* | 11/2015 | Sampath | G06F 11/20 714/4.11 |
| 2018/0039628 | A1* | 2/2018 | de Lavarene | G06F 9/5061 |
| 2018/0074915 | A1* | 3/2018 | Yang | G06F 11/2028 |
| 2021/0286515 | A1* | 9/2021 | Gazit | G06F 3/0655 |

* cited by examiner

*Primary Examiner* — Jigar P Patel
(74) *Attorney, Agent, or Firm* — Mintz Levin Cohn Ferris Glovsky and Popeo, P.C.

(57) ABSTRACT

A method, a system, and a computer program product for executing a takeover process. A takeover process of a primary computing system by a secondary computing system is triggered. The secondary computing system stores transaction data replicated from the primary computing system. Writing of a redo log of transaction data of one or more transactions into storage by the primary computing system is suspended. The redo log is written by the primary computing system prior to the suspending is transmitted to the secondary computing system. The takeover process of the primary computing system by the secondary computing system is executed upon receiving and persisting the redo log at the secondary computing system.

20 Claims, 6 Drawing Sheets

REPLICATION SYSTEM TAKEOVER WITH HANDSHAKE

TECHNICAL FIELD

This disclosure relates generally to data processing and, in particular, to a replication system takeover with a handshake process.

BACKGROUND

Software applications provide companies with an ability to efficiently and effectively conduct their businesses. Software applications deal with various aspects of companies' businesses, including finances, product development, human resources, customer service, management, and many other aspects. During their lifecycles, software applications can undergo a multitude of updates and/or corrections. Some of these updates/corrections may be required to accommodate changing needs of the companies, updates to other software applications, changes in operating systems that companies employ, as well as for any other reasons.

Database management systems have become an integral part of many computer systems. These systems handle hundreds of thousands of transactions per second. Transactions include addition, modification, deletion and/or any other manipulation of data records. When a transaction is executed, a log is created. Logs keep record of a specific action that may have been performed as part of the transaction, allow analysis of a transaction, and, if necessary, perform undo/redo of the transaction. When logs are replayed, the database systems may be put in a particular state to allow for point-in-time recovery, crash-restart, etc. In view of the complexity and size of the database systems, log replays may be slow processes that depend on a particular way specific redo records are written and typically require taking systems offline. Thus, in view of some of these issues, the underlying databases face challenges in order to optimize performance.

SUMMARY

In some implementations, the current subject matter relates to a computer implemented method for executing a takeover process. The method may include triggering a takeover process of a primary computing system by a secondary computing system, the secondary computing system storing transaction data replicated from the primary computing system, and suspending a writing of a redo log of transaction data of one or more transactions into storage by the primary computing system. The redo log may be written by the primary computing system prior to the suspending is transmitted to the secondary computing system. The method may further include executing the takeover process of the primary computing system by the secondary computing system upon receiving and persisting the redo log at the secondary computing system.

In some implementations, the current subject matter may include one or more of the following optional features. In some implementations, the triggering includes determining a status of each primary computing system computing process configured for replication to the secondary computing system. Upon determination that each primary computing system computing process configured for replication to the secondary computing system is not active, the method may be configured to abort the takeover process. Upon determination that each primary computing system computing process configured for replication to the secondary computing system is active, the method may perform the suspending and the executing.

In some implementations, suspending may include suspending executing of one or more transactions at the primary computing system. The transactions may be new transactions scheduled to be executed after the triggering. Alternatively or in addition to, transactions may be current transactions being executed at the time of the triggering. Further, suspending may include delaying suspending of the current transaction for a predetermined period of time.

In some implementations, executing of the takeover process may include suspending execution of the primary computing system and changing the secondary computing system into a new primary computing system.

In some implementations, the redo log may be generated for a data record in the primary computing system. The redo log may indicate a change in persistency of the data record in the primary computing system. Execution of a replay of a redo log may generate a state of the data record prior to the change in persistency recoded in the redo log. The data record may be a table in the database. Further, the change in persistency may include at least one of the following actions: a modification of the data record, an insertion of the data record, a deletion of the data record, an addition of a column to the data record, and any combination thereof.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

To address these and potentially other deficiencies of currently available solutions, one or more implementations of the current subject matter relate to methods, systems, articles of manufacture, and the like that can, among other possible advantages, provide a replication system takeover with a handshake process.

Figure 1:
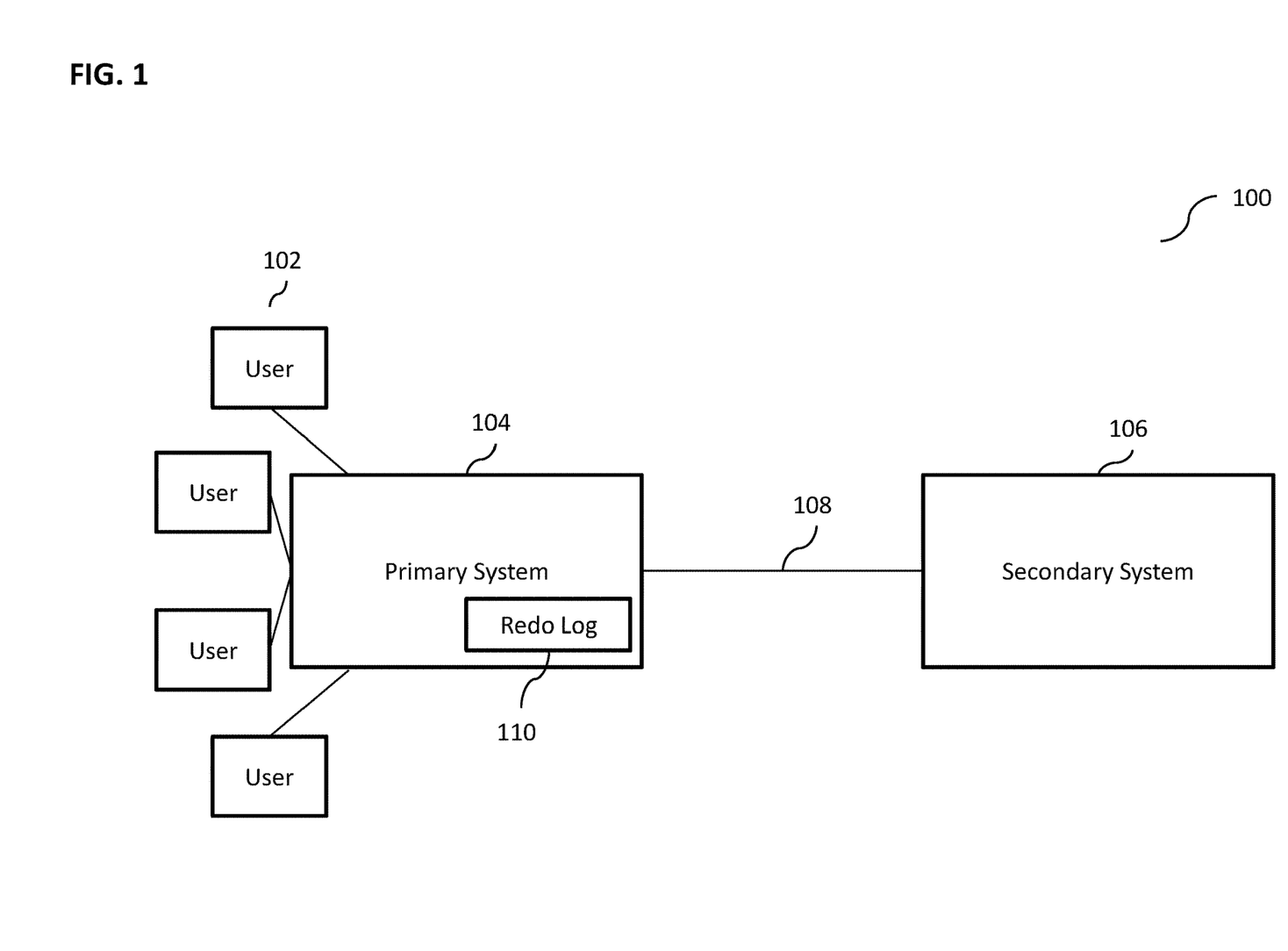
FIG. 1 illustrates an exemplary replication system that may be configured to perform a takeover process and implement a handshake protocol, according to some implementations of the current subject matter.

FIG. 1 illustrates an exemplary replication system 100 that may be configured to perform a takeover process and implement a handshake protocol, according to some implementations of the current subject matter. Components and/or users of the system 100 may be any type of hardware, software, and/or any combination of both. A component of the system 100 may further include entire computing systems that may have its own libraries, user interface elements, deployment parameters and/or systems, lifecycles, operation and support processes, etc. For example, the system 100 may be implemented in various in-memory database systems, such as a High Performance Analytic Appliance ("HANA") system as developed by SAP SE, Walldorf, Germany, as will be discussed in further detail below.

As shown in FIG. 1, the system 100 may include one or more users 102, one or more first computing systems 104, and/or one or more computing systems 106. The users 102 and/or systems 104, 106 may be communicatively coupled using any type of communication connection, including connection between systems 104 and 106, which may include, but is not limited to, wired, wireless, and/or a combination of both network(s). The networks may include various local area networks (LAN), wide area networks (WAN), metropolitan area networks (MAN), virtual private networks (VPN), virtual local area networks (VLAN), and/or any combination thereof.

Each of the users 102 and/or systems 104, 106 may be any type of computing systems, computing components, software, hardware, cloud computing systems, etc., and/or any combination thereof. In some exemplary implementations, the systems 104, 106 may include SQL servers and/or may be part of one or more databases and/or communicatively coupled to one or more databases. The system 104 may further include one or more controllers and/or processors and/or computing components 110 that may be configured generate a redo log. The redo log may be used to record all transactions that may be executed by the computing system 104. The systems 104, 106 may also include one or more interfaces that may be used for generation of redo logs, connection between systems and/or users.

In some implementations, the systems 104, 106 may be configured to include one or more databases that may be used to store various data arranged in one or more tables. The stored data may be modified, by way of a non-limiting example, through one or more data manipulation language ("DML") processes, which may include one or more operations, including but not limited to, INSERT (e.g., insertion of data into an existing data at a predetermined offset or location), UPDATE (e.g., modification of stored data), and DELETE (e.g., deletion of stored data). Additionally, for example, the stored data may be affected using various data definition language ("DDL") statements, which may include creation of various schema for data storage. In some implementations, the databases may include one or more servers, processors, memory locations, cloud computing components/systems, etc. that may be used during creation of databases, testing, redo of operations, creation of logs, etc.

When database records are created, modified, deleted, the system 100 may generate various logs that may include various information about transactions that may have been executed by the system 100. The logs may be important to ensure integrity, synchronization, etc. of the records, databases, etc. A redo log component 110 may be used to generate such redo logs. The redo log component 110 may include any type of computing system, computing component, software, hardware, cloud computing system, etc., and/or any combination thereof. In some implementations, the redo log component 110 may provide a log replay (also, referred to as "logreplay") functionality.

During operation of a database system (e.g., HANA (as developed by SAP SE, Walldorf, Germany)), there may be one or more operations that may be executed concurrently (while obeying the atomicity, consistency, isolation, and durability ("ACID") properties). All actions that modify persistency of the database write one or more redo records. When logreplay functionality is executed, the redo records may be replayed to place that database into a predetermined state (e.g., prior to insertion of a record into the database). The logreplay functionality may be used during crash-restart of a computing system, point-in-time recovery of the computing system, in high-availability secondary systems, Active/Active systems, and/or any other types of systems and/or for any other purposes. Redo records may be written for different layers and/or components in the database. The redo log component 110 may be used to handle various types of redo records during execution of the logreplay functionality. All redo records of different types may first be encountered as a single stream (e.g., in sequential order or as records from a concurrent action).

In some implementations, the system 106 may serve a secondary and/or disaster recovery system to the system 104, which may be considered as a primary system that may be accessed by users. In the event that the primary system 104 becomes unavailable, the secondary system 106 may be configured to takeover operations of the system 104 in order to provide continuity of services to users 102. To ensure that the system 106 has most up-to-date information on applications, transactions, data, etc. of the system 104, applications, data, transactions, etc. of system 104 may need to be replicated to the system 106 and the system 104 may be configured to provide its redo log records to the system 106. Once takeover occurs, system 106 becomes the primary system. The takeover by the system 106 may be a planned takeover, such as for the purposes of executing near zero downtime upgrades as well as any other reasons.

During any takeover, it is important that no data loss occurs (e.g., all primary system 104 updates must be available on the secondary system 106). Moreover, once takeover occurs, the primary system 104 may need to be isolated to avoid duality or multiplicity of active primary systems.

Figure 2:
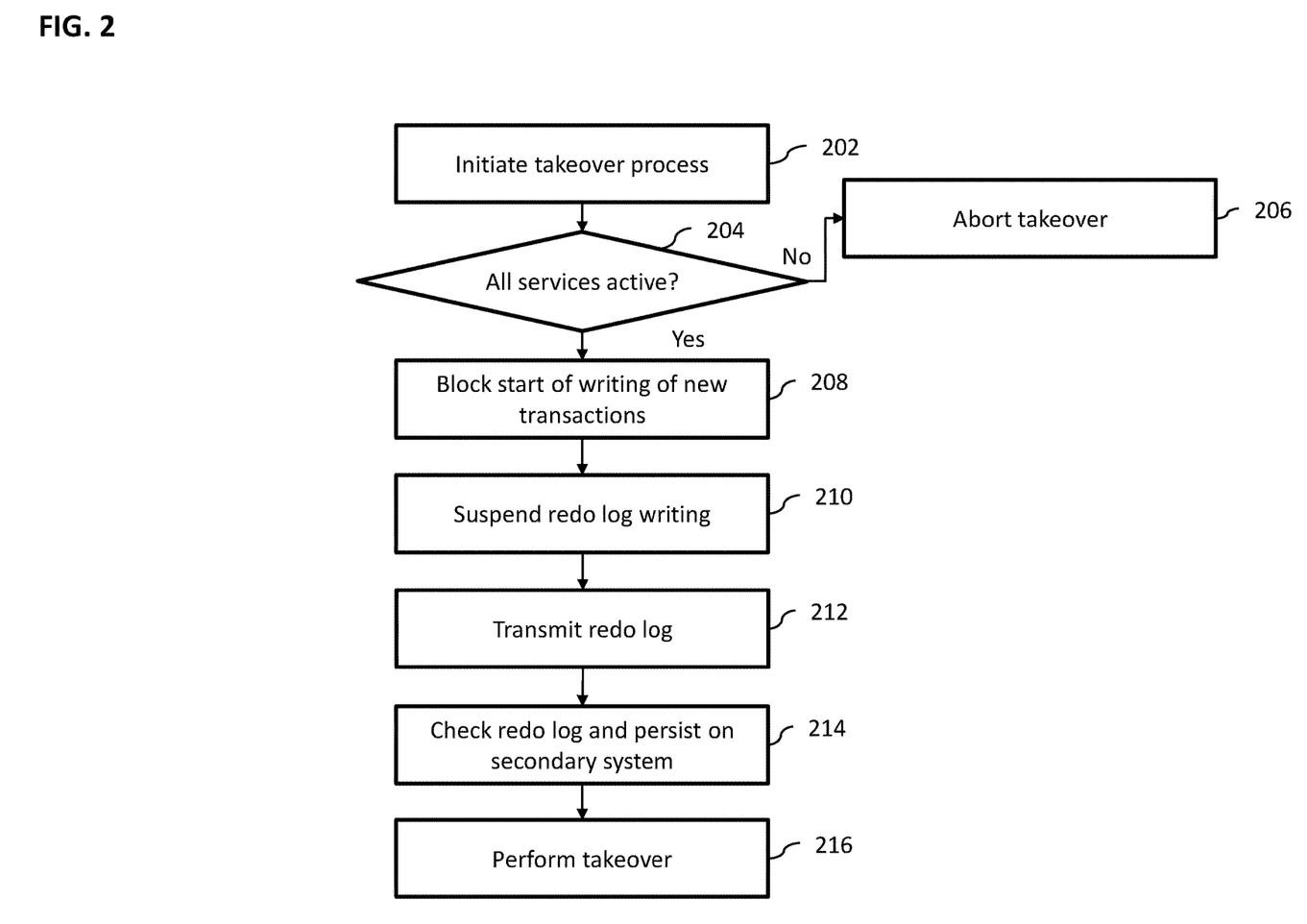
FIG. 2 illustrates an exemplary process for performing a takeover, according to some implementations of the current subject.

FIG. 2 illustrates an exemplary process 200 for performing a takeover, according to some implementations of the current subject matter. The process 200 may be configured to be performed by the system 100 shown in FIG. 1. The process 200 may be configured to prevent loss of data during the takeover procedure as well as ensure that the primary system 104 is suspended once takeover by the secondary system 106 occurs. The process 200 may be further configured to execute a "suspend and sync" phase prior to execution of the actual takeover by the secondary system 106.

Referring to FIG. 2, at 202, a takeover process may be initiated. The takeover process may be initiated at the secondary system 106 and/or at the primary system 104. Once system takeover is enabled, each server process on the secondary system 106 may establish a connection with its primary system 104's counterpart and request a snapshot of the data. All logged changes in the primary system 104 may be replicated continuously. Each persisted redo log in the primary system 104 may be transmitted to the secondary system 106. A transaction in the primary system 104 (e.g., during replication process being executed in a synchronous and/or synchronous in-memory modes, as described below) is not committed before the redo logs are replicated. While the system replication process is running, the secondary system 106, which may be configured identically to the primary system 104, may be on standby until a takeover takes place.

In some implementations, replication process may be executed in one or more modes: synchronous, synchronous in-memory, and asynchronous. In the synchronous mode, the secondary system 106 may transmit acknowledgement back to primary system 104, as soon as data is received and persisted to disk. In the synchronous in-memory mode, the secondary system 106 may transmit acknowledgement back to primary system 104 as soon as data is received. In the asynchronous mode, the primary system 104 might not wait until the secondary system 106 sends an acknowledgement.

At 204, the primary system 104 may be configured to determine whether replication status of all services that may be involved in the takeover process is active, which may include ensuring that the connection between systems 104, 106 is active. If one or more services are not active, the takeover process may be aborted, at 206.

Otherwise, the process 200 may be configured to proceed to 208, where writing/execution of any new transactions scheduled for execution (e.g., scheduled for execution after initiation of the takeover process) may be blocked. The primary system 104 may be configured to allow any transactions that are being currently written, to complete their execution. Alternatively, or in addition to, the system 104 may be configured to wait a predetermined period of time for any existing or current transactions to complete writing (e.g., using the following command: maxWriteTransactionWaitTime=<time_s>). This may be configured to reduce an impact of the takeover on the application side, i.e., the system may try to finish already started write transactions, and only the remaining write transactions may be aborted after the takeover.

At 210, the primary system 104 may be configured to suspend the redo log writes on all services being executed at the primary system 104. This may be configured to isolate the primary system 104 and prevent logging of update operations (as all relevant update operations must be redo-logged).

Once the primary system 104 is isolated, the primary system 104 may be configured to transmit the generated redo log to the secondary system, at 212. The secondary system 106 may then determine whether the entirety of the redo log has been received from the primary system 104 and persisted on all services at the secondary system 106, at 214. This may be configured to prevent any data loss and ensure that the secondary system 106 may execute logreplay up to the exact state of the suspended primary system 104. This may be configure to complete a handshake process, whereby the secondary system 106 takes-over the primary system 104, at 216, and becomes the primary system while the original primary system 104 remains suspended.

In some implementations, if any of the pre-takeover operations 202-214 fail, the takeover process 200 may be aborted and operations of the primary system 104 may be resumed. Hence, except for the temporary blocking of write transactions, there is minimal impact on the system 100 and the replication may remain as it was prior to takeover attempt. This makes it much easier to perform a planned takeover in a secure way, without relying on external handling or tools.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 3:
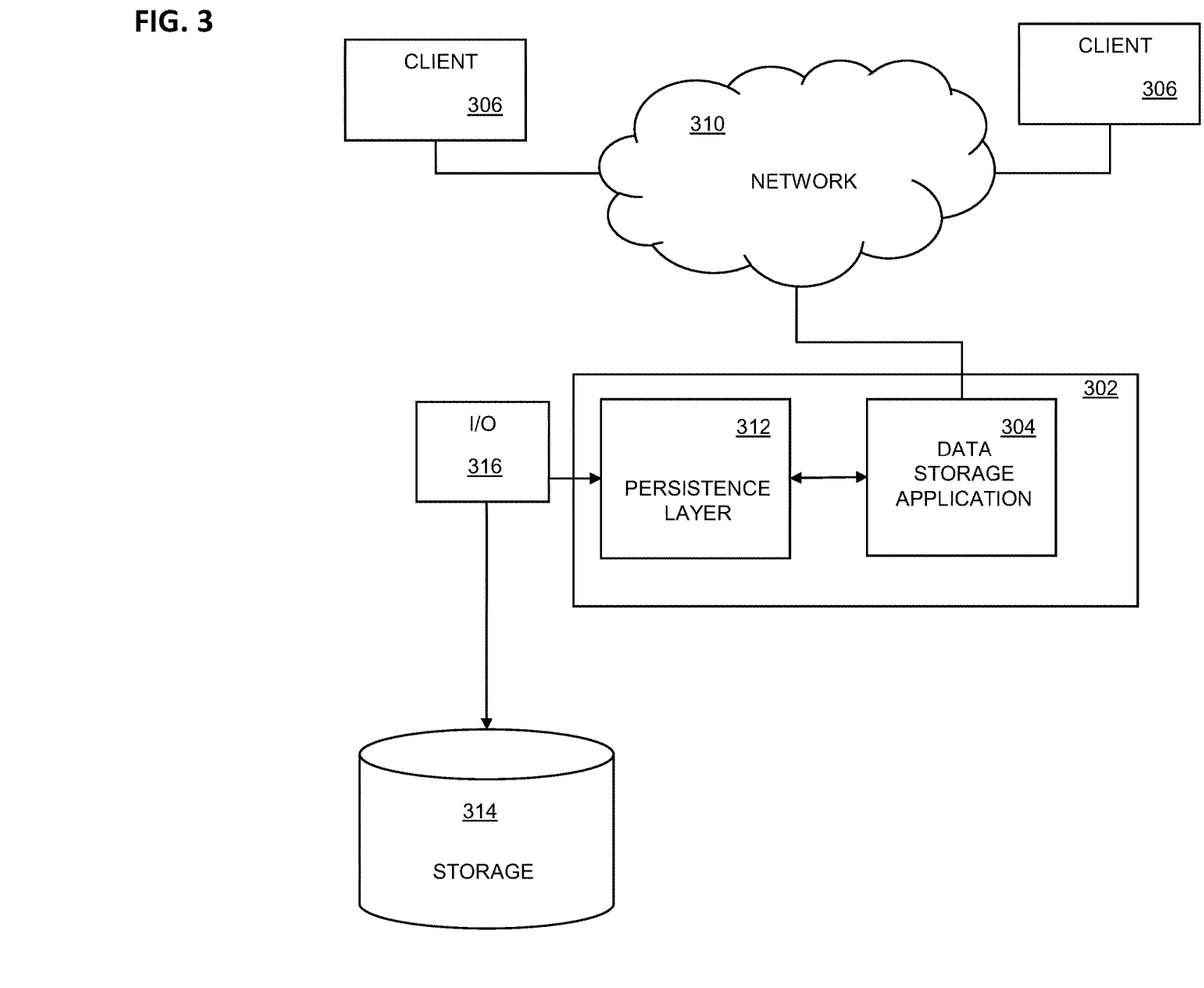
FIG. 3 is a diagram illustrating an exemplary system including a data storage application, according to some implementations of the current subject matter.

FIG. 3 illustrates an exemplary system 300 in which a computing system 302, which may include one or more programmable processors that may be collocated, linked over one or more networks, etc., executes one or more modules, software components, or the like of a data storage application 304, according to some implementations of the current subject matter. The data storage application 304 may include one or more of a database, an enterprise resource program, a distributed storage system (e.g. NetApp Filer available from NetApp of Sunnyvale, Calif.), or the like.

The one or more modules, software components, or the like may be accessible to local users of the computing system 302 as well as to remote users accessing the computing system 302 from one or more client machines 306 over a network connection 310. One or more user interface screens produced by the one or more first modules may be displayed to a user, either via a local display or via a display associated with one of the client machines 306. Data units of the data storage application 304 may be transiently stored in a persistence layer 312 (e.g., a page buffer or other type of temporary persistency layer), which may write the data, in the form of storage pages, to one or more storages 314, for example via an input/output component 316. The one or more storages 314 may include one or more physical storage media or devices (e.g. hard disk drives, persistent flash memory, random access memory, optical media, magnetic media, and the like) configured for writing data for longer term storage. It should be noted that the storage 314 and the input/output component 316 may be included in the computing system 302 despite their being shown as external to the computing system 302 in FIG. 3.

Data retained at the longer term storage 314 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 4:
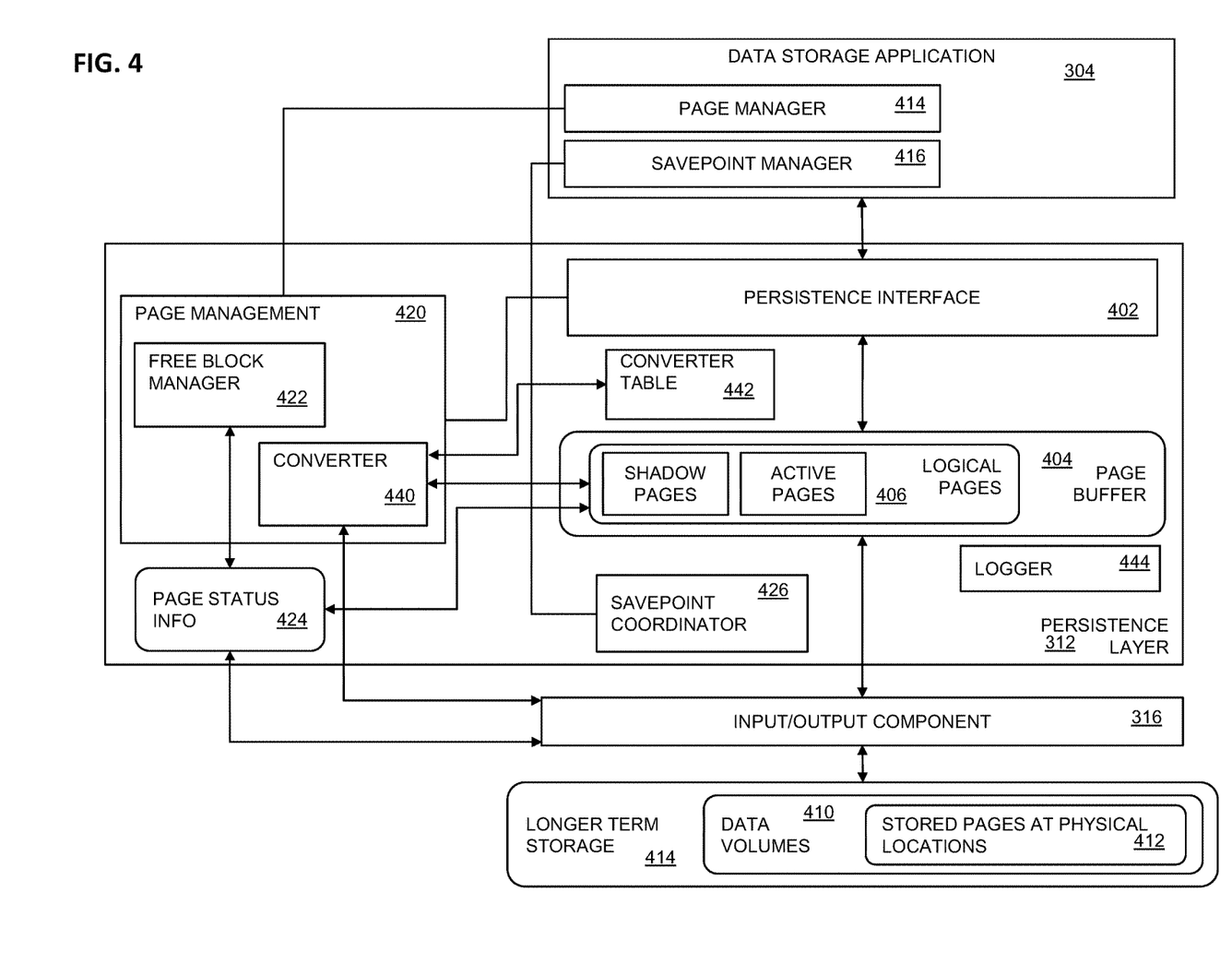
FIG. 4 is a diagram illustrating details of the system of FIG. 3.

FIG. 4 illustrates exemplary software architecture 400, according to some implementations of the current subject matter. A data storage application 304, which may be implemented in one or more of hardware and software, may include one or more of a database application, a network-attached storage system, or the like. According to at least some implementations of the current subject matter, such a data storage application 304 may include or otherwise interface with a persistence layer 312 or other type of memory buffer, for example via a persistence interface 402. A page buffer 404 within the persistence layer 312 may store one or more logical pages 406, and optionally may include shadow pages, active pages, and the like. The logical pages 406 retained in the persistence layer 312 may be written to a storage (e.g. a longer term storage, etc.) 314 via an input/output component 316, which may be a software module, a sub-system implemented in one or more of software and hardware, or the like. The storage 314 may include one or more data volumes 410 where stored pages 412 are allocated at physical memory blocks.

In some implementations, the data storage application 304 may include or be otherwise in communication with a page manager 414 and/or a savepoint manager 416. The page manager 414 may communicate with a page management module 420 at the persistence layer 312 that may include a free block manager 422 that monitors page status information 424, for example the status of physical pages within the storage 314 and logical pages in the persistence layer 312 (and optionally in the page buffer 404). The savepoint manager 416 may communicate with a savepoint coordinator 426 at the persistence layer 312 to handle savepoints, which are used to create a consistent persistent state of the database for restart after a possible crash.

In some implementations of a data storage application 304, the page management module of the persistence layer 312 may implement a shadow paging. The free block manager 422 within the page management module 420 may maintain the status of physical pages. The page buffer 404 may include a fixed page status buffer that operates as discussed herein. A converter component 440, which may be part of or in communication with the page management module 420, may be responsible for mapping between logical and physical pages written to the storage 314. The converter 440 may maintain the current mapping of logical pages to the corresponding physical pages in a converter table 442. The converter 440 may maintain a current mapping of logical pages 406 to the corresponding physical pages in one or more converter tables 442. When a logical page 406 is read from storage 314, the storage page to be loaded may be looked up from the one or more converter tables 442 using the converter 440. When a logical page is written to storage 314 the first time after a savepoint, a new free physical page is assigned to the logical page. The free block manager 422 marks the new physical page as "used" and the new mapping is stored in the one or more converter tables 442.

The persistence layer 312 may ensure that changes made in the data storage application 304 are durable and that the data storage application 304 may be restored to a most recent committed state after a restart. Writing data to the storage 314 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 444 may also be included to store the changes made to the data of the data storage application in a linear log. The logger component 444 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 444 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 312 may use a combination of undo log entries (from one or more logs) and shadow paging.

The persistence interface 402 may handle read and write requests of stores (e.g., in-memory stores, etc.). The persistence interface 402 may also provide write methods for writing data both with logging and without logging. If the logged write operations are used, the persistence interface 402 invokes the logger 444. In addition, the logger 444 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 444. For an entry of type "update", for example, this would be the identification of the affected record and the after image of the modified data.

When the data application 304 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 444 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 444 may write a database log (or simply referred to herein as a "log")

sequentially into a memory buffer in natural order (e.g., sequential order, etc.). If several physical hard disks/storage devices are used to store log data, several log partitions may be defined. Thereafter, the logger 444 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 304 may use shadow paging so that the savepoint manager 416 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 5:
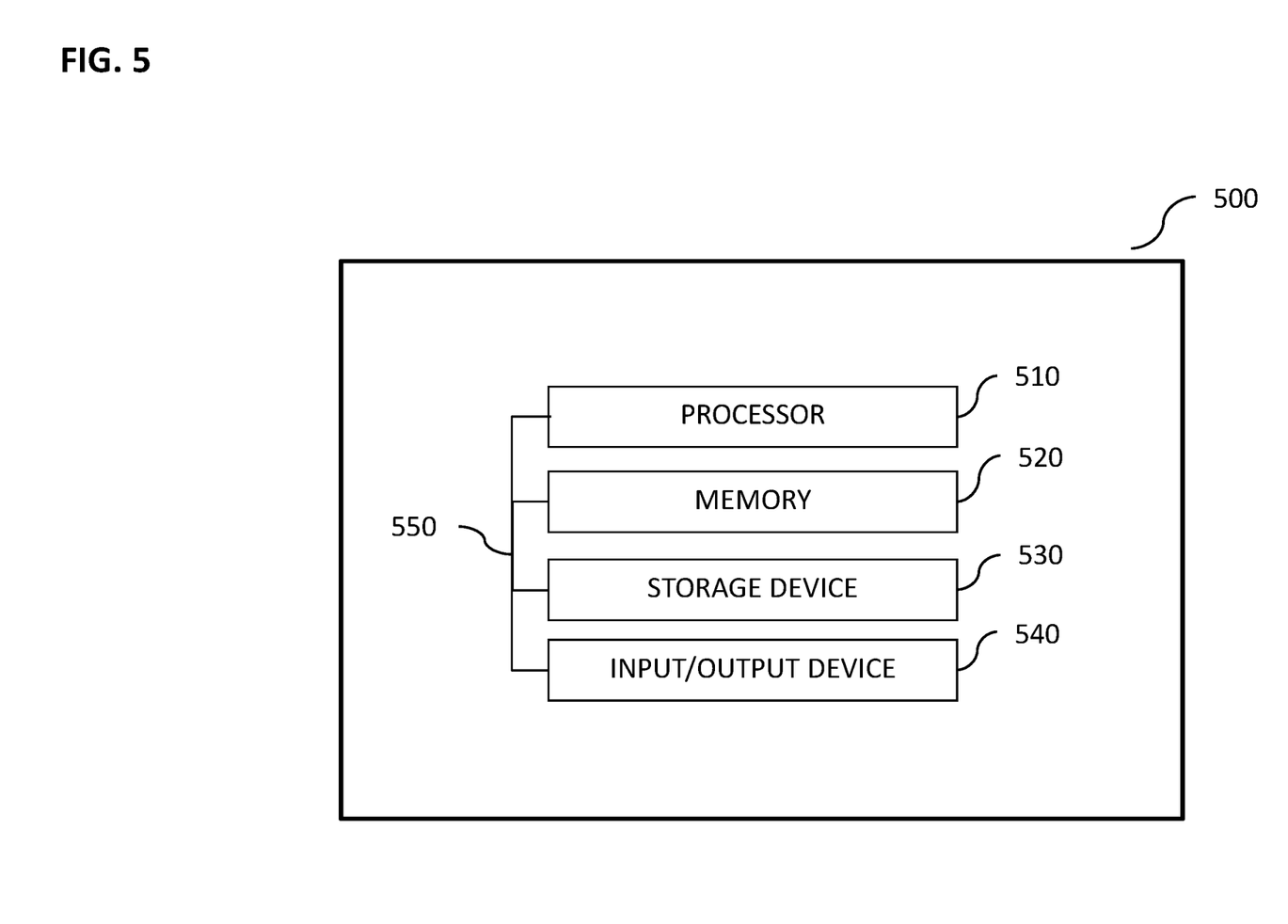
FIG. 5 is an exemplary system, according to some implementations of the current subject matter.

In some implementations, the current subject matter may be configured to be implemented in a system 500, as shown in FIG. 5. The system 500 may include a processor 510, a memory 520, a storage device 530, and an input/output device 540. Each of the components 510, 520, 530 and 540 may be interconnected using a system bus 550. The processor 510 may be configured to process instructions for execution within the system 500. In some implementations, the processor 510 may be a single-threaded processor. In alternate implementations, the processor 510 may be a multi-threaded processor. The processor 510 may be further configured to process instructions stored in the memory 520 or on the storage device 530, including receiving or sending information through the input/output device 540. The memory 520 may store information within the system 500. In some implementations, the memory 520 may be a computer-readable medium. In alternate implementations, the memory 520 may be a volatile memory unit. In yet some implementations, the memory 520 may be a non-volatile memory unit. The storage device 530 may be capable of providing mass storage for the system 500. In some implementations, the storage device 530 may be a computer-readable medium. In alternate implementations, the storage device 530 may be a floppy disk device, a hard disk device, an optical disk device, a tape device, non-volatile solid state memory, or any other type of storage device. The input/output device 540 may be configured to provide input/output operations for the system 500. In some implementations, the input/output device 540 may include a keyboard and/or pointing device. In alternate implementations, the input/output device 540 may include a display unit for displaying graphical user interfaces.

Figure 6:
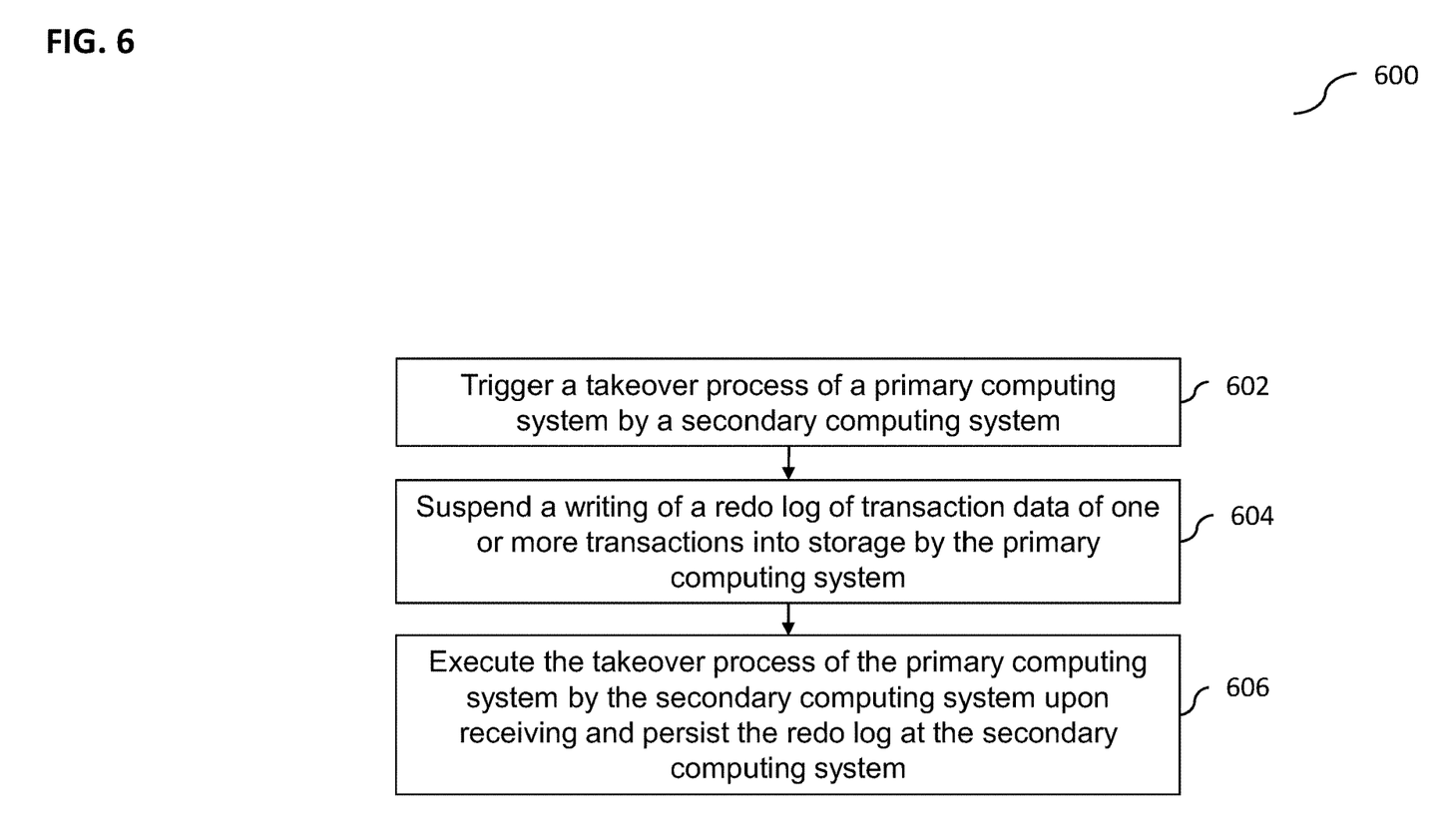
FIG. 6 is an exemplary method, according to some implementations of the current subject matter.

FIG. 6 illustrates an exemplary method 600 for executing a takeover process, according to some implementations of the current subject matter. At 602, a takeover process of a primary computing system (e.g., system 104 shown in FIG. 1) may be triggered (e.g., by command suspendPrimary) by a secondary computing system (e.g., system 106). The secondary computing system may store transaction data replicated from the primary computing system.

At 604, a writing of a redo log of transaction data of one or more transactions into storage by the primary computing system may be suspended (e.g., as shown by 208-210 in FIG. 2). The redo log written by the primary computing system prior to the suspending may be transmitted to the secondary computing system (e.g., on continuous basis to ensure that the secondary system has a complete replica of the primary system).

At 606, the takeover process of the primary computing system by the secondary computing system may be executed upon receiving and persisting the redo log at the secondary computing system.

In some implementations, the current subject matter may include one or more of the following optional features. In some implementations, the triggering includes determining a status of each primary computing system computing process configured for replication to the secondary computing system. Upon determination that each primary computing system computing process configured for replication to the secondary computing system is not active, the method may be configured to abort the takeover process. Upon determination that each primary computing system computing process configured for replication to the secondary computing system is active, the method may perform the suspending and the executing.

In some implementations, suspending may include suspending executing of one or more transactions at the primary computing system. The transactions may be new transactions scheduled to be executed after the triggering. Alternatively or in addition to, transactions may be current transactions being executed at the time of the triggering. Further, suspending may include delaying suspending of the current transaction for a predetermined period of time.

In some implementations, executing of the takeover process may include suspending execution of the primary computing system and changing the secondary computing system into a new primary computing system.

In some implementations, the redo log may be generated for a data record in the primary computing system. The redo log may indicate a change in persistency of the data record in the primary computing system. Execution of a replay of a redo log may generate a state of the data record prior to the change in persistency recoded in the redo log. The data record may be a table in the database. Further, the change in persistency may include at least one of the following actions: a modification of the data record, an insertion of the data record, a deletion of the data record, an addition of a column to the data record, and any combination thereof.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer-implemented method, comprising:
   triggering a takeover process of a primary computing system by a secondary computing system, the secondary computing system storing transaction data replicated from the primary computing system;
   suspending a writing of a redo log of transaction data of one or more transactions into storage by the primary computing system, the suspending including blocking of writing of the transaction data into the redo log after the triggering of the takeover process, wherein the redo log written by the primary computing system prior to the suspending is transmitted to the secondary computing system; and
   executing, using a handshake protocol, the takeover process of the primary computing system by the secondary computing system upon receiving and persisting the redo log at the secondary computing system, the persisting including verifying receipt of an entirety of the redo log from the primary computing system and persisting the verified redo log on all services of the secondary computing system, wherein upon completion of the handshake protocol, the secondary computing system becoming the primary computing system.

2. The method according to claim 1, wherein the triggering includes determining a status of each primary computing system computing process configured for replication to the secondary computing system;
   wherein upon determination that each primary computing system computing process configured for replication to the secondary computing system is not active, aborting the takeover process;
   wherein upon determination that each primary computing system computing process configured for replication to the secondary computing system is active, performing the suspending and the executing.

3. The method according to claim 1, wherein the suspending includes suspending executing of one or more transactions at the primary computing system.

4. The method according to claim 3, wherein the one or more transactions is a new transaction scheduled to be executed after the triggering.

5. The method according to claim 3, wherein the one or more transactions is a current transaction being executed at the time of the triggering.

6. The method according to claim 5, wherein the suspending includes delaying suspending of the current transaction for a predetermined period of time.

7. The method according to claim 1, wherein the executing includes suspending execution of the primary computing system and changing the secondary computing system into a new primary computing system.

8. The method according to claim 1, wherein the redo log is generated for a data record in the primary computing system, the redo log being indicative of a change in persistency of the data record in the primary computing system, wherein execution of a replay of a redo log generates a state of the data record prior to the change in persistency recoded in the redo log.

9. The method according to claim 8, wherein the data record is a table in the database.

10. The method according to claim 9, wherein the change in persistency includes at least one of the following actions: a modification of the data record, an insertion of the data record, a deletion of the data record, an addition of a column to the data record, and any combination thereof.

11. A system comprising:
at least one programmable processor; and
a non-transitory machine-readable medium storing instructions that, when executed by the at least one programmable processor, cause the at least one programmable processor to perform operations comprising:
triggering a takeover process of a primary computing system by a secondary computing system, the secondary computing system storing transaction data replicated from the primary computing system;
suspending a writing of a redo log of transaction data of one or more transactions into storage by the primary computing system, the suspending including blocking of writing of the transaction data into the redo log after the triggering of the takeover process, wherein the redo log written by the primary computing system prior to the suspending is transmitted to the secondary computing system; and
executing, using a handshake protocol, the takeover process of the primary computing system by the secondary computing system upon receiving and persisting the redo log at the secondary computing system, the persisting including verifying receipt of an entirety of the redo log from the primary computing system and persisting the verified redo log on all services of the secondary computing system, wherein upon completion of the handshake protocol, the secondary computing system becoming the primary computing system.

12. The system according to claim 11, wherein the triggering includes determining a status of each primary computing system computing process configured for replication to the secondary computing system;
wherein upon determination that each primary computing system computing process configured for replication to the secondary computing system is not active, aborting the takeover process;
wherein upon determination that each primary computing system computing process configured for replication to the secondary computing system is active, performing the suspending and the executing.

13. The system according to claim 11, wherein the suspending includes suspending executing of one or more transactions at the primary computing system.

14. The system according to claim 13, wherein the one or more transactions is a new transaction scheduled to be executed after the triggering.

15. The system according to claim 13, wherein the one or more transactions is a current transaction being executed at the time of the triggering.

16. The system according to claim 15, wherein the suspending includes delaying suspending of the current transaction for a predetermined period of time.

17. The system according to claim 11, wherein the executing includes suspending execution of the primary computing system and changing the secondary computing system into a new primary computing system.

18. The system according to claim 11, wherein the redo log is generated for a data record in the primary computing system, the redo log being indicative of a change in persistency of the data record in the primary computing system, wherein execution of a replay of a redo log generates a state of the data record prior to the change in persistency recoded in the redo log.

19. The system according to claim 18, wherein
the data record is a table in the database;
the change in persistency includes at least one of the following actions: a modification of the data record, an insertion of the data record, a deletion of the data record, an addition of a column to the data record, and any combination thereof.

20. A computer program product comprising a non-transitory machine-readable medium storing instructions that, when executed by at least one programmable processor, cause the at least one programmable processor to perform operations comprising:
triggering a takeover process of a primary computing system by a secondary computing system, the secondary computing system storing transaction data replicated from the primary computing system;
suspending a writing of a redo log of transaction data of one or more transactions into storage by the primary computing system, the suspending including blocking of writing of the transaction data into the redo log after the triggering of the takeover process, wherein the redo log written by the primary computing system prior to the suspending is transmitted to the secondary computing system; and
executing, using a handshake protocol, the takeover process of the primary computing system by the secondary computing system upon receiving and persisting the redo log at the secondary computing system, the persisting including verifying receipt of an entirety of the redo log from the primary computing system and persisting the verified redo log on all services of the secondary computing system, wherein upon completion of the handshake protocol, the secondary computing system becoming the primary computing system.

* * * * *